(12) United States Patent
McLoughlin et al.

(10) Patent No.: US 11,692,583 B2
(45) Date of Patent: Jul. 4, 2023

(54) LOCKING DEVICE

(71) Applicants: Peter McLoughlin, Banbury (GB);
John McLoughlin, Manchester (GB)

(72) Inventors: Peter McLoughlin, Banbury (GB);
John McLoughlin, Manchester (GB)

(*) Notice: Subject to any disclaimer, the term of this patent is extended or adjusted under 35 U.S.C. 154(b) by 0 days.

(21) Appl. No.: 17/536,343

(22) Filed: Nov. 29, 2021

(65) Prior Publication Data

US 2022/0178400 A1    Jun. 9, 2022

(30) Foreign Application Priority Data

Dec. 3, 2020 (GB) .................................... 2019044

(51) Int. Cl.
*F16B 39/24* (2006.01)
*F16B 39/10* (2006.01)

(52) U.S. Cl.
CPC .......... *F16B 39/108* (2013.01); *F16B 39/103* (2013.01); *F16B 39/24* (2013.01)

(58) Field of Classification Search
CPC ...................................................... F16B 39/24
USPC .................... 411/149, 150, 160, 162, 163
See application file for complete search history.

(56) References Cited

U.S. PATENT DOCUMENTS

| 162,270 | A | * | 4/1875 | Brunson | .................. | F16B 39/24 |
|---|---|---|---|---|---|---|
| | | | | | | 411/959 |
| 622,583 | A | * | 4/1899 | Young | ..................... | F16B 39/24 |
| | | | | | | 411/957 |
| 853,237 | A | * | 5/1907 | Gray | ....................... | F16B 39/24 |
| | | | | | | 411/957 |
| 871,921 | A | * | 11/1907 | Fish | ......................... | F16B 39/24 |
| | | | | | | 411/957 |
| 954,010 | A | * | 4/1910 | Alt | .......................... | F16B 39/24 |
| | | | | | | 411/138 |

(Continued)

FOREIGN PATENT DOCUMENTS

CN         102829060 A      12/2012
CN         111173828 A       5/2020

(Continued)

OTHER PUBLICATIONS

GB Intellectual Property Office, Patents Act 1977: Search Report under Section 17, List of Prior Art, dated Mar. 11, 2022, pp. 1-2, Great Britain.

*Primary Examiner* — Flemming Saether
(74) *Attorney, Agent, or Firm* — Merek, Blackmon & Voorhees, LLC

(57) ABSTRACT

A locking device (11), e.g. a lock washer, for use with a screw threaded fastener (71), said locking device comprising at least a first disc-like body (12) comprising an annular portion (13) with at least one aperture (15) therein and a central through-hole (14) e.g. a washer having notches (15) open to the outer periphery and at least one further body (25) held in said one aperture (15). The further body may be shim (22) also having a central hole (24) and at least one tab (25) which extends through the notch (15) and has an end portion which juts above adjacent surface of the washer to engage an adjacent surface on the fastener when compressed, on tightening of the fastener deflects within the void of the aperture in which it is located under the influence of the tightening of the engaging surface such that under any tendency to loosen, the tab jams against the opposing surfaces and resist loosening of the fastener.

5 Claims, 5 Drawing Sheets

FIG. 4

(56) References Cited

U.S. PATENT DOCUMENTS

| | | | | |
|---|---|---|---|---|
| 971,784 A * | 10/1910 | Pfister | ............... | F16B 39/24 |
| | | | | 411/138 |
| 1,034,697 A * | 8/1912 | Darling | ............... | F16B 39/24 |
| | | | | 411/957 |
| 1,116,350 A * | 11/1914 | Bystrom | ............... | F16B 39/24 |
| | | | | 411/149 |
| 1,622,581 A * | 3/1927 | Gunkel | ............... | F16B 39/24 |
| | | | | 411/150 |
| 7,661,914 B2 * | 2/2010 | Liu | ............... | F16B 39/282 |
| | | | | 411/141 |

FOREIGN PATENT DOCUMENTS

| | | | |
|---|---|---|---|
| FR | 2227454 | A | 11/1974 |
| GB | 25742 | A | 11/1910 |
| JP | 2015224671 | A | 12/2015 |
| JP | 2016156489 | A | 9/2016 |

\* cited by examiner

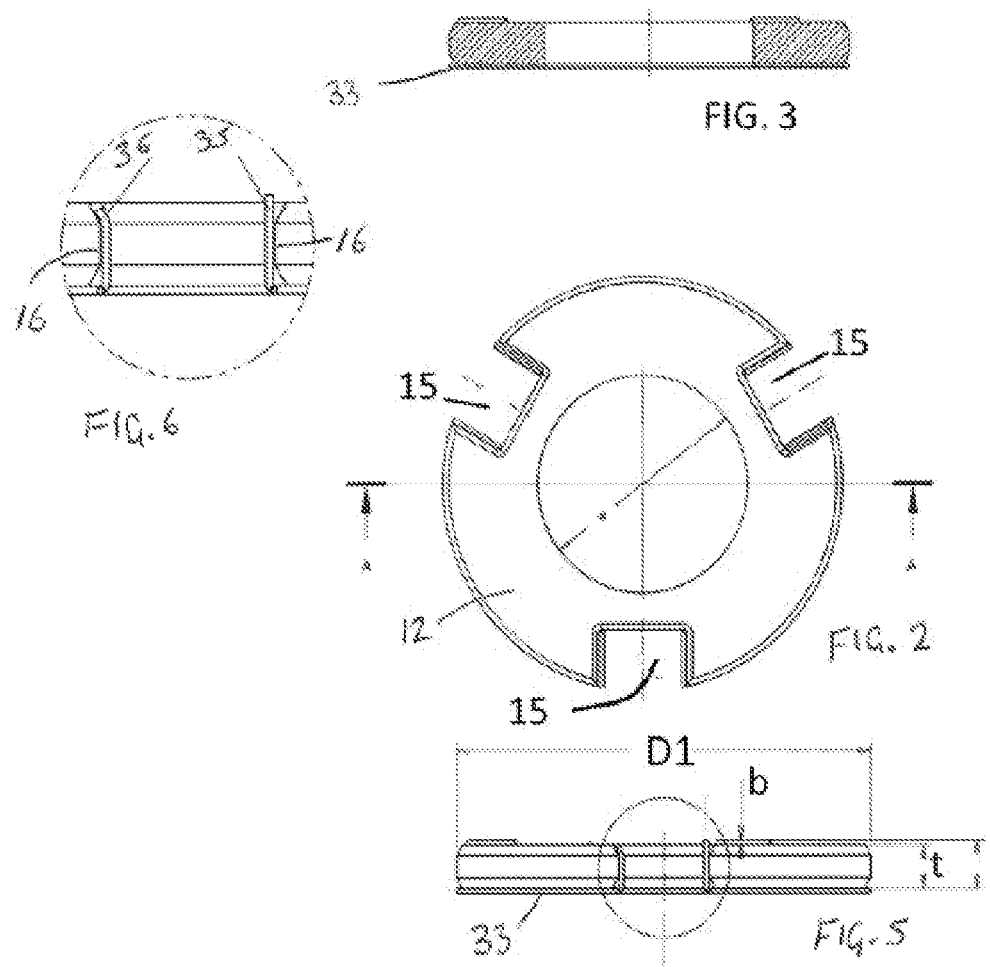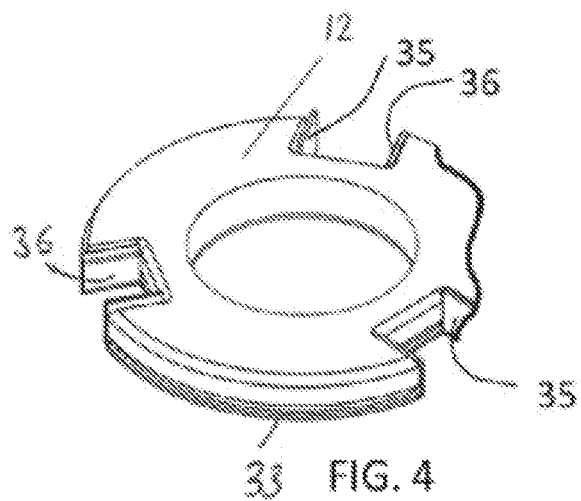

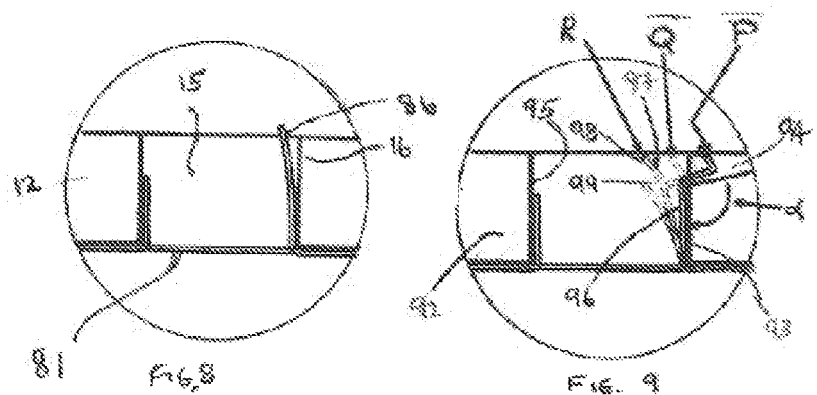
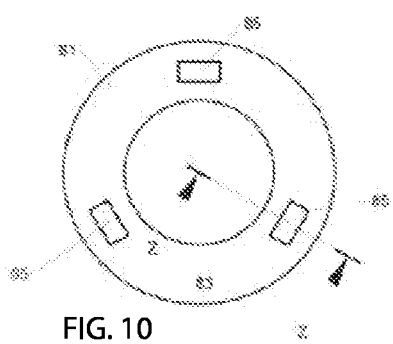
FIG. 10
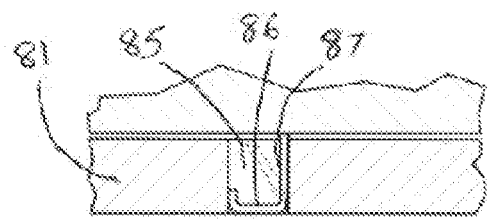
FIG. 11
FIG. 12

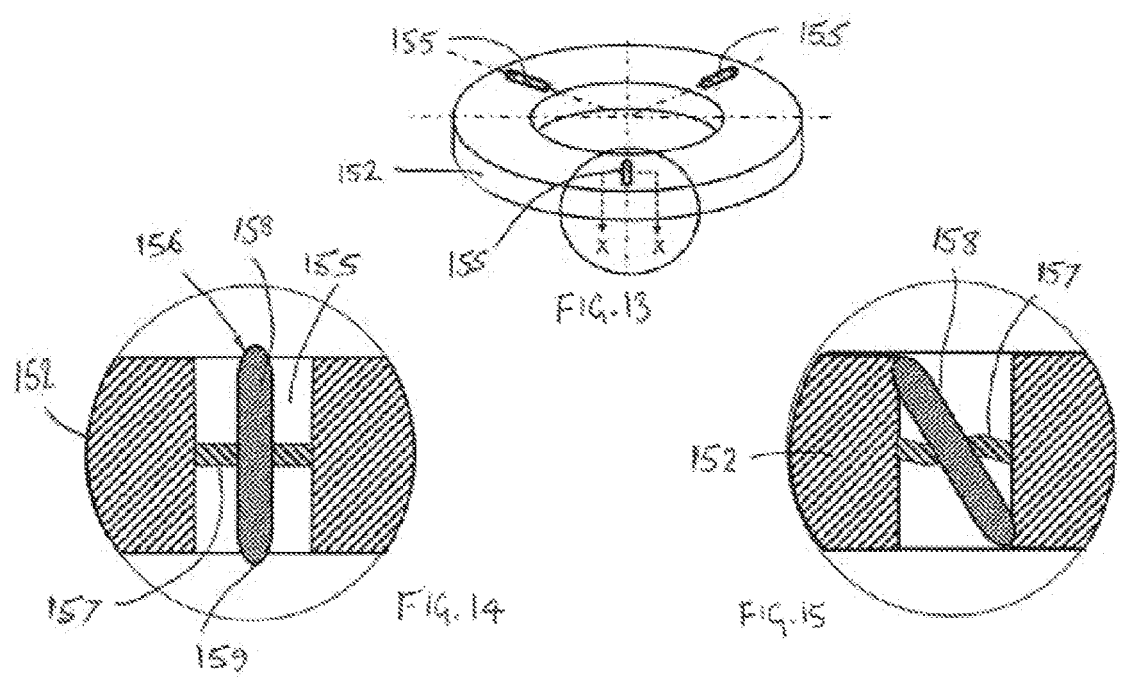

LOCKING DEVICE

FIELD

This invention relates to locking devices, in particular washers, for use with screw threaded fasteners to help prevent their undesired loosening during use.

BACKGROUND OF THE INVENTION

Locking or lock washers are well known, see for example U.S. Pat. No. 1,782,387 which discloses a shaped annular washer having radially projecting fingers that distort when squeezed between a screw head and fastening surface. Other types of washer comprise two annular bodies with an upper body adjacent the screw head and a lower body adjacent the fastening surface of the member to be secured, for example US2004131443(A1), US2007110542 (A1) and U.S. Pat. No. 9,732,782 (B). All the devices include sets of locking teeth on at least one of the annular bodies to engage with at least one of the surfaces between which the washer is squeezed on tightening of the fastener. These devices including the serrated sets of rigid teeth rigid teeth typically of a harder material than either the fastener head or the workpiece so as to dig in to or indent the material of the fastener head or workpiece and are relatively expensive to manufacture and limited in their effectiveness.

Object of the present Invention

The object of the invention is a simplified locking device is to prevent the unwanted reduction of clamping load of threaded fasteners in use particularly in conditions of severe vibration even when the substrate surface is smooth and/or harder than the material from which the locking washer is formed.

STATEMENTS OF INVENTION

According to the present Invention, there is provided a locking device for use with a screw threaded fastener, said locking device comprising at least a first disc-like body comprising an annular portion with at least one aperture therein and a central through-hole and at least one further body held in said one aperture, the further body having a least one projection extending through the one aperture and having an end portion jutting above adjacent surface of the disc-like body to engage an adjacent planar surface on the fastener when compressed on tightening of the fastener so that the projection deflects within the void of the aperture in which it is located under the influence of the tightening of the engaging surface such that under any tendency to loosen, the tab jams against the opposing surfaces and resist loosening of the fastener.

Preferably there are at least two spaced apertures in the annular portion, the apertures being preferably equiangularly spaced apart around the annular portion.

The further body may comprise a deformable clip having at least one projection jutting beyond the adjacent surface of said disc-like body. Each clip may be a U-shaped or W shaped clip having two arms, one of which projects beyond the surface of the disc-like body to contact the surface of the fastener.

The spaced apertures may form notches open to a periphery of the disc-like body, typically the outer periphery.

The further body may comprise a second disc-like body concentric with the first disc-like body and having an annular portion with a central through-hole, the annular portion of the second body having at least one upstanding projection formed by a tab integral with the annular portion and extending through an aperture to contact the surface on the fastener. The second body may be in the form of at least one shim which is relatively thin, as compared with the base washer.

Preferably, the annular portion of said second body has a plurality of tabs each aligned with a respective notch and projecting therethrough.

More preferably, the annular portion of said second body has a plurality of pairs of tabs, each pair of tabs aligned with a respective notch such that the tabs in each pair engage a side face of each notch and preferably only one tab of each pair projects through the respective notch to contact the fastener. The one tab of each pair may be curved away from its adjacent sidewall. Another form of one tab has a curved upper end of which is accommodated in a recess in the adjacent sidewall.

Yet another form of further body comprises a relatively rigid member such as a blade, rod, strut etc. held in a resiliently held in a support housed in the aperture.

DESCRIPTION OF THE DRAWINGS

The invention will be described by way of example and with reference to the accompanying drawings in which:

FIGS. 2 to 6 are views of a second locking device also according to the invention, FIG. 8 is another form of deformable clip to that shown in FIG. 2

FIG. 9 shows a section through a modified annular first body and yet another form of clip, FIG. 10 is a plan view yet another locking device, FIG. 11 is a section on the line z-z of FIG. 10, FIG. 12 is a view of an alternative clip to that shown in FIG. 11

FIG. 13 is an isometric view of anther embodiment of a locking device, and

FIGS. 14 & 15 are sections on the line x-x of FIG. 13 showing the operation of the locking device.

DETAILED DESCRIPTION OF THE INVENTION

Figure 1:
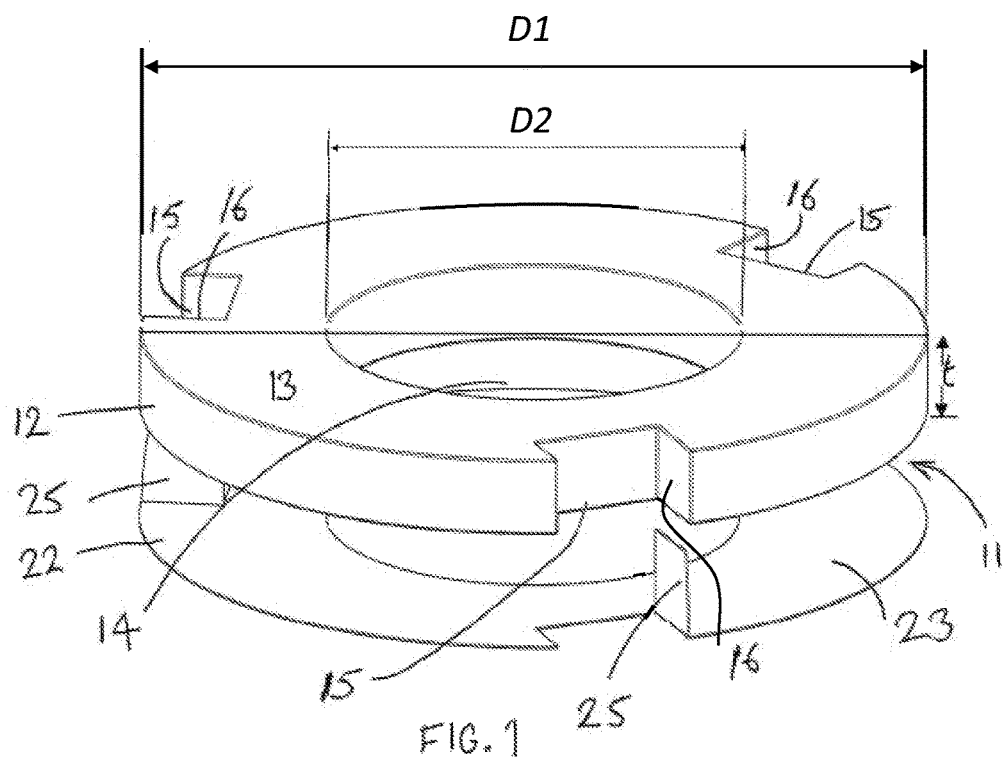
FIG. 1 is an exploded isometric view of a first locking device according to the present invention.

With reference to FIG. 1 of the drawings and according to the present Invention, there is provided a locking device 11 for use with a screw threaded fastener. The locking device comprising two parts, a first disc-like body 12 in the form of a washer comprising an annular portion 13 with central through-hole 14 which in use accommodates a screw-threaded stud or bolt. (see FIG. 9) and a second part 22 in the form of an annular shim.

The washer 12 has an outer diameter "D1"; the inner diameter "D2" and thickness "t" which may be standardised and has at least one and preferably three equiangularly spaced further apertures 15 in the annular portion 13. The further apertures 15 are in the form of slots or notches spaced around a periphery of the annular portion 13. These notches 15 may be open to the outer periphery of the washer, as shown, having lateral sides 16 with surfaces normal to both surfaces of the annular washer 12. The sides can be parallel with each other or radial of the washer.

The shim 22 is concentric with the washer 12 having an annular portion 23 with a central through-hole 24, the annular portion of the shim having at least one upstanding projection formed by a tab 25 integral with the annular portion 23. The tab 25 extends through a notch 15 in the washer 12 to contact with a fastener, typically a bolt head or nut. The annular portion 23 of said shim, preferably, has a plurality of tabs 25 each aligned with a respective notch 15 and projecting therethrough.

Figure 7B:
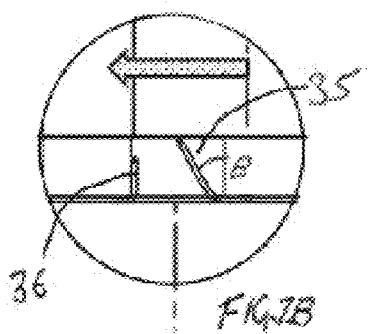
FIGS. 7A-F are schematic views of the projections on the locking device of FIG. 2 during tightening and loosening of the fastener.
Figure 7C:
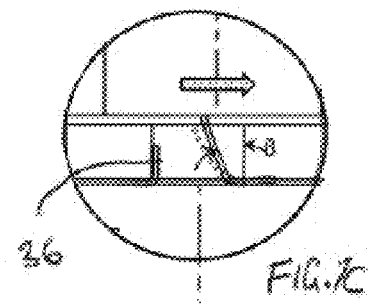
Figure 7A:
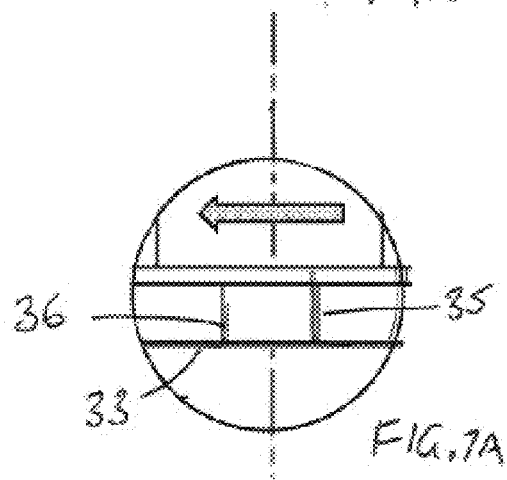
Figure 7F:
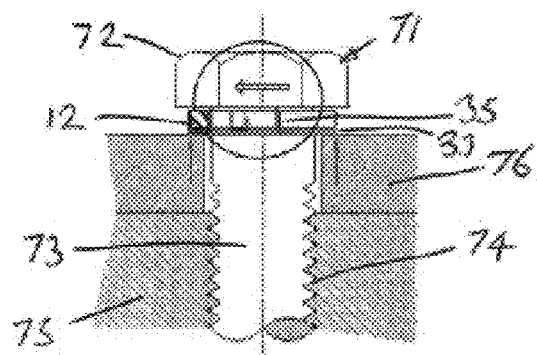

The shim 22 is relatively thin compared to the washer 12 and has tabs 25 that extend axially through the notches 15 to protrude above the adjacent surface of the annular portion 13 of the washer 12, in use to abut an adjacent surface on the fastener on tightening of the fastener (see FIG. 7F). The number of tabs 25 will be determined in conjunction with the thickness of the shim 22 and empirically according to the desired unclamping torque. Tab 25 is of a length "I" which is greater than the thickness "t" of the main washer 12 such that it protrudes a small amount, "b", [to be determined empirically] beyond the adjacent surface of the main washer. The greater number of notches and the thicker the shim, the higher the unclamping torque as the tab must be distorted or deformed beyond the point of jamming to loosen the fastener.

The thickness of the tab 25 can be built up from one or more leaves laminated together to from the tab (not shown).

With reference to FIGS. 2-6, there is shown a second embodiment of the invention also comprising a washer 12 as is shown in FIG. 1. The washer 12 cooperates with a shim 33 which has pairs of raised tabs 35,36, also equiangularly spaced around the periphery and which each engage in a respective slot 15 in the main washer 12. The two tabs 35,36 locate against the lateral sides 16 of the respective notches 15 to secure the shim 33 in place. The tab 36 is of length not greater than the full thickness T of the washer 12 and sits below the surface of the washer. The tab 36 may be configured to hold the shim 33 to the washer 12 as shown in FIG. 6. The other tab 35 projects through its respective notch 15 and its distal end portion juts above the adjacent surface of the washer.

Now with reference also to FIGS. 7A-F, there is shown a screw-fastener 71 having a hexagonal head 72 and a shank 73 which engages a screw-threaded hole 74 in a component 75. Other suitable shaped heads or nuts may be used. The embodiment shows the arrangement for a right-hand (or clockwise) threaded fastener. In the case of a left-hand threaded fasteners, the relative positions of the raised tabs would be on the opposite faces of the peripheral slots.

The fastener 71 when tightened holds a second component 76 fast with the component 75. As the fastener is tightened, the mating surface of the threaded fastener makes contact with the tip of tab 35 as can be seen in FIG. 7A. Further rotation of the fastener 71 causes the tab 35 to deflect in the direction of the fastening movement, as shown in FIG. 7B, through an angle which is greater than the helix angle of the thread but lower than the limit of the "jamming angle" of the tab. (The "jamming angle" is the limiting angle between two bodies in which the application of a force at an angle to the normal of the contacting surfaces produces a wedging action and binds the two bodies, thereby preventing sliding, because the force required parallel to the two mating surfaces produces, through the resolution of forces at the contact edge, a greater locking load than a sliding load. It can be demonstrated by resolution of forces that the "Jamming Angle" occurs when the tangent of the angle of inclination of the vertical force is lower that the coefficient f friction [μ]) of the engaging surfaces. Typically, the angle of inclination β of the tab 35 from the vertical for the locking washer 11 would be greater than 5° but less than 30°.

Figure 7D:
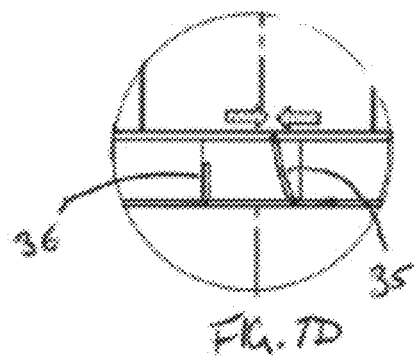
Figure 7E:
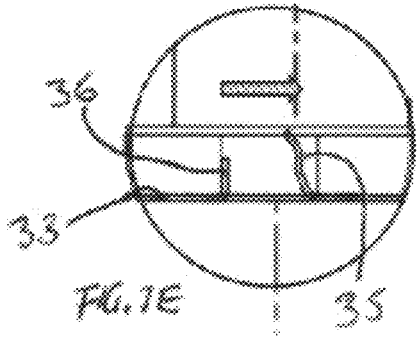

As the fastener 71 tends to rotate in the untightening sense (see FIG. 7C), the contact friction, combined with the elasticity of the tab 35 on the contact surface between the shim 33 and fastener 91, causes the tab 35 to tend to return to its initial at-rest position at a rate greater than the thread helix angle will allow, thus applying a jamming force on the thread and thereby preventing the fastener from further undesired rotation FIG. 7D. Deliberate loosening of the fastener 71 by application of a tool to the head 72 causes the tab 35 to ultimately deform allowing further loosening of the fastener as shown in FIG. 7E and to complete removal of the fastener if required.

With reference to FIG. 8 there is shown a shim 81 similar to the shim 33 excepting that the upper portion of the tab 86 is curved away from the lateral sidewall of the notch 15. This ensures that the reaction of the tab 86 is against the side wall 16. This makes for a shorter stiffer tab providing a higher unwinding torque to the tab shown in FIGS. 3-6.

Referring now to FIG. 9, there is shown a washer 92 similar to the washer 12 excepting that the notch 95 is provided with an inclined recess 94 which opens into the notch 95 at sidewall 93 adjacent to the tab 96. The recess 94 is also open to the adjacent surface of the washer. The tab 96 lies against its adjacent sidewall 93 and has a shaped end portion 97 accommodated within the recess 94. The end portion 97 is a zig-zag shape with its lower portion 99 having a downward facing surface supported by the recess 94. The recess 94 is inclined at an angle α to the sidewall 93 typically of between 100-120°. The mouth of the recess adjacent the sidewall 93 will have sufficient depth to accommodate the end portion 97 so that it can freely enter onto the recess as it returns to its initial rest position. The tip 98 of the end portion 97 is proud of the washer surface. The tab 96 is shown in different positions P, Q & R during the tightening of the fastener. From a starting position P, the fastener contacts the tip 98 and flexes the fastener to position Q and finally to position R. This will initiate "jamming" as per the above tabs 35 & 86 as the fastener is loosened. This has the advantage of being more generous on manufacturing tolerances. Further unwinding is achieved by application of a tool and causing the tab 96 to buckle.

In another embodiment (not show) the end portion 97 of the tab 96 may be curved in shape instead of zig-zag.

Another embodiment of the invention is shown in FIGS. 10 & 11 in which first disc-like body is a washer 81 having three enclosed apertures 85 in the annular portion 83. The further body 86 is deformable clip and is a resilient fit in a respective aperture 85. Each clip 86 has at least one projection 87 jutting above the adjacent surface of said disc-like body. The projection 87 acting in the same way as tabs 25,35 previously described to jam against the smooth adjacent surface of the fastener. The clip 86 is shown in FIG. 11 as a U-shaped clip and shown in FIG. 12 as a W shaped clip 96 in which the base of the clip has a central corrugation 97.

With reference now to FIGS. 13-15, there is shown a further embodiment of the invention in which the first disc like body is a washer 152 with a planar portion 153 having a plurality of enclosed apertures 155 therein. Preferably there are three equiangularly spaced apertures which are radially aligned in the planar portion. A further body 156 is housed in each aperture. Each further body comprises an elastomeric support 157 made from a suitable material e.g. neoprene, chloroprene, and a blade 158 held in the support 157. The blade 158 may be formed from a suitable polymeric material such as a nylon. The blade 158 has curved ends 159 and is longer than the thickness of the washer 152. When used with a fastener the surface on the fastener contacts the projecting end 159 of the blade and the support 157 distorts under further rotation of the fastener so that the blade 158 jams against the smooth surface of the fastener and is flush with the washer surface as shown in FIG. 14. The means of supporting the blade in a resilient manner may also include suitably shaped metallic elements, rather than elastomeric ones, for those applications requiring a temperature resistance beyond their melting or decomposition temperatures.

We claim:

1. A locking device for use with a screw threaded fastener, said locking device comprising:
   a first disc-like body coaxial with said fastener and comprising an annular portion defining a plurality of apertures equiangularly spaced along the annular portion and having a central through-hole therethrough;
   at least one further body having a first and second projection projecting from said further body through a respective one of said apertures;
   said first projection extending through the respective one of said apertures and having an end portion jutting above an adjacent surface of the first disc-like body to engage an adjacent planar surface on the fastener when compressed on tightening of the fastener so that said first projection deflects within the respective aperture in which it is located under the influence of the tightening of the fastener such that under any tendency to loosen, the first projection jams against the adjacent planar surface of the fastener and resists loosening of the fastener;
   wherein the further body comprises a second disc-like body coaxial with the first disc-like body and having a second annular portion with a second central through-hole therethrough, and the second annular portion connects said first projection to said second projection; and
   wherein the first and second projection are aligned with the respective aperture such that the first projection engages a first side wall of the respective aperture and the second projection engages a second side wall of the respective aperture.

2. A locking device as claimed in claim 1, wherein only one projection of said first and second projections of said first disc-like body projects through its respective aperture to contact a fastener.

3. A locking device as claimed in claim 2, wherein an upper end portion of said first projection is curved away from the first side wall.

4. A locking device as claimed in claim 3 wherein the upper end portion of said first projection has a curved upper end which is accommodated in a recess in the first side wall.

5. A locking device as claimed in claim 1, wherein the first projection is resilient.

* * * * *